United States Patent [19]

Nitzberg et al.

[11] 4,326,640
[45] Apr. 27, 1982

[54] CONTAINER SYSTEM FOR CARRYING AND SUPPLYING FOOD AND WATER FOR PETS

[76] Inventors: Nadine R. Nitzberg, 9610 Orpin Rd., Randallstown, Md. 21133; Michelle L. Baldwin; Steven M. Baldwin, both of The Village Square North Apts., 9029 Contee Rd., Laurel, Md. 20811

[21] Appl. No.: 167,233

[22] Filed: Jul. 10, 1980

[51] Int. Cl.³ .................. B65D 21/02; A45C 11/20; A47G 23/04
[52] U.S. Cl. .................. 220/4 E; 206/501; 220/4 D
[58] Field of Search ............... 220/4 D, 4 E; 206/501

[56] References Cited

U.S. PATENT DOCUMENTS

| | | | |
|---|---|---|---|
| 1,542,115 | 6/1925 | Weis | 220/4 D |
| 2,080,283 | 5/1937 | Lowenfels | 206/501 |
| 2,097,186 | 10/1937 | Hinnekamp . | |
| 2,287,312 | 6/1952 | Kader . | |
| 2,326,414 | 8/1943 | Thompson | 220/4 D |
| 2,595,113 | 4/1952 | Taberer | 220/4 D |
| 2,604,976 | 7/1952 | Sarf . | |
| 3,384,259 | 5/1968 | Hoffstadt | 220/4 D |
| 3,489,267 | 1/1970 | Carpenter . | |
| 3,806,699 | 4/1974 | Hanning . | |
| 3,811,559 | 5/1974 | Carter | 220/4 D |
| 4,078,701 | 3/1978 | Clubb | 220/4 D |

FOREIGN PATENT DOCUMENTS

| | | | |
|---|---|---|---|
| 2033811 | 1/1972 | Fed. Rep. of Germany | 206/501 |
| 806158 | 9/1936 | France | 206/501 |

Primary Examiner—George E. Lowrance
Attorney, Agent, or Firm—John F. McClellan, Sr.

[57] ABSTRACT

Improvement in a series of containers vertically stackable includes said containers inter-sealing in combination to form several compartments, and including top element in the form of a feeding pan downwardly oriented, upper element in the form of an open top container closable by the top element and with a downwardly oriented feeding pan on the bottom, intermediate element of the feeding pans back-to-back, and lower element in the form of an open top container connectable by the intermediate element to the lower element.

1 Claim, 7 Drawing Figures

FIG. I

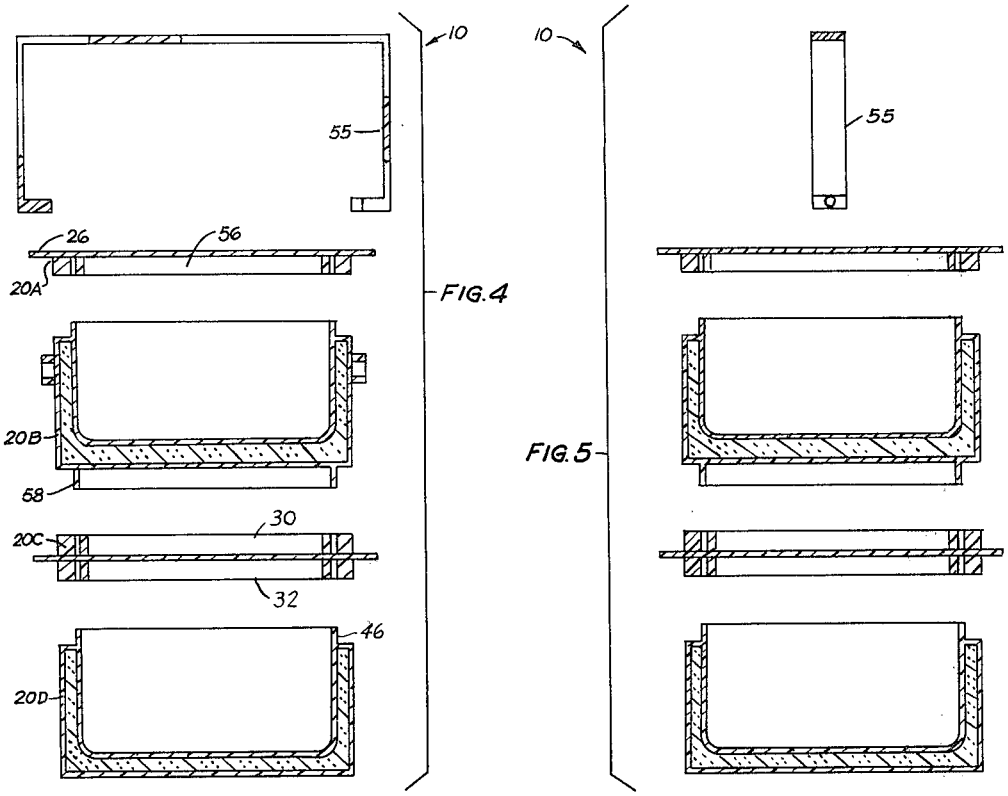
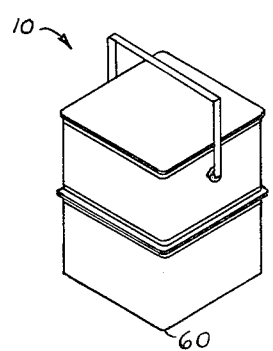
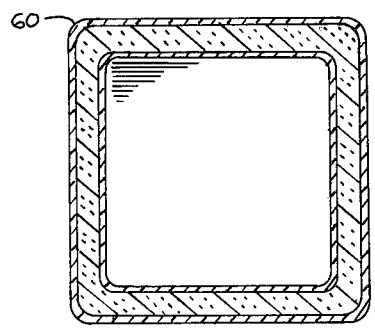

CONTAINER SYSTEM FOR CARRYING AND SUPPLYING FOOD AND WATER FOR PETS

This invention relates generally to containers and specifically to a container system for carrying and supplying food and water for pets. When travelling, a substantial percentage of the public takes along the family pets, show dogs or cats, or other species that need fresh food and fresh cool water.

Even when away from home for a part of a day pets should have fresh water available, and preferably food if needed, in a convenient, sanitary, safe and economical manner.

An object of this invention is to provide an interconnectable container array particularly suited for the purpose of refreshing pets at intervals on trips and similar occasions.

In the prior art a number of disclosures of interconnectable containers have been made in U.S. Patents:

U.S. Pat. No. 2,097,186 to D. M. Hinnekamp, 10-26-27, discloses separately covered cylindrical lower insulated container detachably affixed to cylindrical upper container which has a bail type handle.

U.S. Pat. No. 2,287,312 to T. G. A. Kader, 6-23-52, discloses plural cylindrical nested containers, each with a separate cover, and a bail type handle;

U.S. Pat. No. 2,604,976 to F. A. Sarf, 7-29-52, discloses a cylindrical lower container for liquid, with separate top, and a cylindrical sleevelike upper portion for food, with separate cover, and a bail type handle;

U.S. Pat. No. 3,806,699 to R. T. Hanning, 4-23-74, discloses a liquid-tight lower container or base detachably mounting above it in series two other containers, wtih cover and holding strap;

U.S. Pat. No. 3,489,267 to P. L. Carpenter 1-13-70 discloses a vertically nested series of containers with bail type handles; FIG. 4 indicates the bottom container as suited for holding liquid.

However, it is believed that no available container array can provide all the advantages of the present invention in accordance with the objects and advantages of this invention.

Further objects are to provide a system as described which is designed:

to be completely self-contained if desired;

to transport pet food and water easily and sanitarily with double-seal throughout;

to provide at least nine modes of use with the four elements making up the invention in various combinations;

to provide three completely closed compartments when all units are assembled together with a provision for ice in the middle compartment to cool selectively the upper and lower compartments;

to provide a total of five feeding and/or storage pans to select from, and three substantially different heights for feeding pets, using selected ones of the four elements;

to provide for sanitary closure of all feeding pans after use, with self draining features for three pans;

to provide feeding pans of two different depths;

to provide a convenient flange grip for selected elements easing the problem of separating the frictionally held elements;

to provide for assuring tight assembly together by one push downward on top of the assembly; and to provide a system which is convenient to use and to clean, which is durable, inexpensive, and attractive in appearance.

In brief summary given for cursive description only and not as limitation, the invention includes as an improvement a series of containers vertically sealable in combinations and in full assembly forming several compartments and including top element in the form of a feeding pan downwardly oriented, upper elements in the form of an open top container closable by the top element and with a downwardly oriented feeding pan on the bottom, intermediate element of two feeding pans back to back, and a lower element in the form of an open top container connectable by means of the intermediate element to the upper element.

The above and other objects and advantages of the invention will become more readily apparent on examination of the following description, including the drawings, in which like reference numerals designate like parts.

FIG. 1 is a side elevational view of the invention in full assembly showing top elements, upper element, intermediate element and lower element;

FIG. 4 is a side elevational exploded view in section of the elements of the invention;

FIG. 5 is an end elevational exploded view thereof;

FIG. 6 is a perspective view of the invention in full assembly; and

FIG. 7 is a cross sectional view typical of the upper and lower elements.

Figure 2:
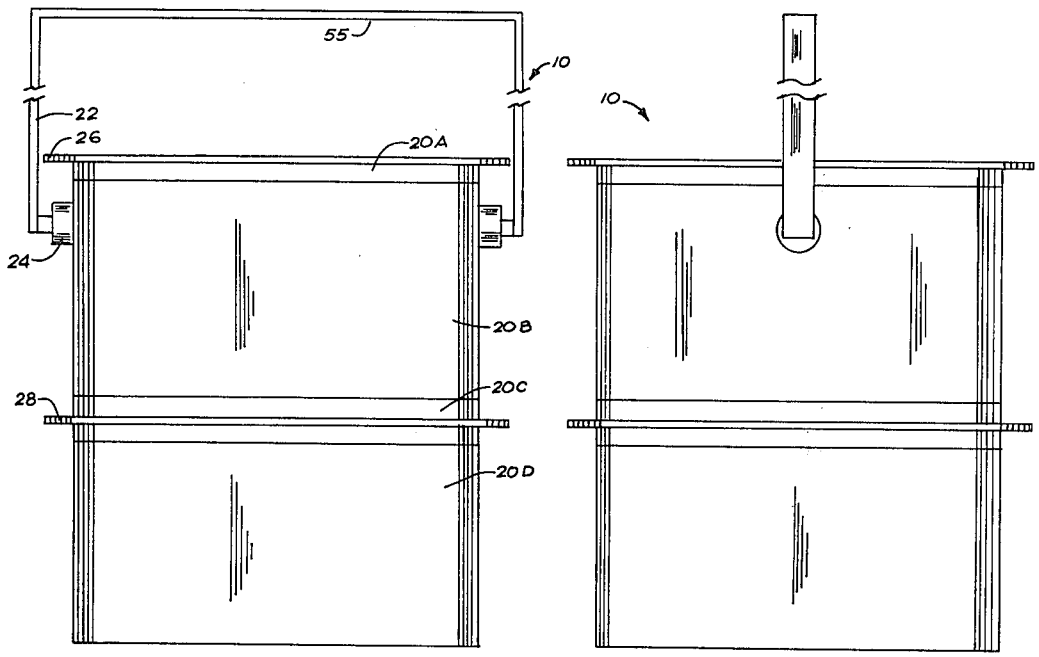
FIG. 2 is an end elevational view at right angles thereto.

FIGS. 1 and 2 show the invention 10 in full assembly, as comprising top element 20A, upper element 20B, intermediate element 20C, lower element 20D. Bail handle 22 conventionally attaches to the upper element at swivels 24 on a centerline of the upper element.

All the elements are preferably generally laterally coextensive except for all-around protrusive planar flange 26 on the top element 20A and similar flange 28 on the intermediate element 20C, which flanges act both as bumpers to help protect the sides of the elements from chafing on obstacles, to aid carrying and to provide hand grips for separating the elements, which are frictionally held together by sealing inter-fitting rim structure.

Figure 3:
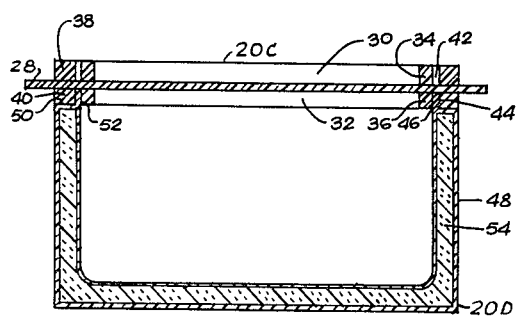
FIG. 3 is an elevational view in section of the lower element and intermediate element of the invention in assembly.

FIG. 3 shows in section a detail typifying the sealing together of elements. Here intermediate element 20C sealing means closes the lower element 20D. For this, the intermediate elements is in the form of identical or symmetrically invertable back-to-back pans 30 and 32, one facing up and one facing down, with respective inner rims 34, 36 which frame the respective pans all around. The flange structure 28 is preferably horizontally planar and extends between the rims as a pan bottom for both pans. Outer rims 38, 40 on the respective pans form with the inner rims 30, 32 respective uniform continuous slots 42, 44, around the perimeter; each is proportioned to receive a tightly engaging upward rim 46 around the open top of the lower element sealing it closed by a double seal.

The lower element rim 46 is preferably recessed inwardly in the wall 48 to leave respective steps 50, 52 around the outer perimeter and the inner perimeter of the lower element on which abut the respective rims of the pans.

Typically a tough dense plastic such as solid polystyrene sheet forms the intermediate element flange and inner rim structures and the engaging means rim 46 on the lower element, and hermetically sheathes the lower element unitary side and lowermost portion or bottom insulation 54, which may be polystyrene foam. The outer rims of the intermediate element may be of the same insulative foam.

FIGS. 4 and 5 show respective exploded views of the entire assembly; top element 20A, upper element 20B, intermediate element 20C, lower element 20D, and bail handle 55.

The top element flange 26 extends fully across in the same manner as the intermediate element flange, and forms the bottom of a pan 56 preferably identical with either of the pans 30, 32 of the intermediate element.

The upper element is preferably the same in structure as the lower element except that it has in addition a downward means 58 for engaging the sealing means like the upward one 46, and the swivels for the handle.

Preferably all sealing means and means for engaging the sealing means are identical in shape, size and fit so that the double rim and single rims fitting between them form a double seal interchangeably throughout. It will be evident that double rims can be exchanged for single rims throughout without departing from the spirit of the invention although some advantages would be different, as in cost and convenience of manufacture.

FIG. 6 shows a perspective view indicating that the elements may have rectangular plan shape with rounded corners 60.

FIG. 7 shows that the interior portions of the containers may be characterized throughout by easy to clean rounded corners.

Inspection of the Figures will indicate the versatility of the invention.

An animal can be fed (1) from the pan of the top element 20A inverted, (2) from the upper element 20B upright, (3) from the pan formed by the upper element 20B inverted (4) (5) from both the pans of the intermediate element 20C (get one pan dirty, flip it over and supply a fresh pan) and (6) from the lower element 20D. The pans offer less capacity preferably than the relatively deeper upper and lower elements.

Further, to help prevent fighting of animals of different sizes while being fed, the pans can be of different heights: alone or in connected assembly from the lowest (top element 20A inverted and set on ground), through the next lowest (intermediate element 20C set on ground), and the next (intermediate element 20C fitted on lower element 20D), and the highest (intermediate element 20C fitted on upper element 20B). In this last combination, the upper element 20B can be turned upside down and drained while simultaneously serving as a support locking to and elevating the intermediate element 20C.

Food or water can be carried in transit in any of three containers: upper element 20B, between upper element and intermediate element 20C, and in bottom or lower element 20D.

Ice can be carried in the middle container formed by the space between the upper element 20B and the intermediate element 20C, to keep both upper element and lower element spaces cool when carrying solid food in the upper element, if more chilling is desired in the upper element 20B, coupled with more retention of cooled air in it, it can be inverted and sealed to the intermediate element 20C which can carry the ice. Similarly the lower element 20D can carry ice in this configuration, or of course, food or water.

Two sealed containers can be carried separately if desired, by combining the top element 20A with either the upper or lower element and the intermediate element with the other.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system of container elements vertically nestable in interconnection for providing covered storage and transport of animal food and drink the system including an upper element, a lower element, an intermediate element between the upper and lower elements, first and second means on the intermediate element for sealing together the upper and lower elements, and the upper and lower elements having means for engaging the sealing means, the improvement comprising: said sealing means comprising respectively relatively shallow identical feeding pans back-to-back in the intermediate element structure, the upper and lower elements comprising respectively relatively deeper containers open at the top, the open top of the upper element also having means for engaging the sealing means, a top element, third means for sealing on the top element, the third means for sealing comprising the top element having a horizontal portion with a relatively shallow feeding pan which is downwardly oriented therein and proportioned for engagement with all said means for engaging the sealing means, all said elements being generally co-extensive laterally, the top element and the intermediate element having respective planar flanges protruding all around beyond the perimeter thereof for protection and for gripping, all said elements having in plan view a rectangular shape with rounded corners, the means for sealing and the means for engaging having respective rim structures forming continuous double seal, said rim structures including double rim structure on said means for sealing and single rim structure on said means for engaging, proportioned for tightly fitting between said double rim structure, all said elements having foam insulation completely therearound, the upper and lower elements having foam insulation in the lower most portions thereof and material encasing substantially all said foam structure except at the means for sealing, and a bail type handle for supporting all said elements when carried in assembly.

* * * * *